US009685189B1

United States Patent
Harper et al.

(10) Patent No.: US 9,685,189 B1
(45) Date of Patent: Jun. 20, 2017

(54) REDUCED REEL MOTOR DISTURBANCES IN A TAPE DRIVE SYSTEM

(71) Applicant: International Business Machines Corporation, Armonk, NY (US)

(72) Inventors: David H. F. Harper, Vail, AZ (US); Kevin B. Judd, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/092,465

(22) Filed: Apr. 6, 2016

(51) Int. Cl.
*G11B 15/32* (2006.01)
*G11B 15/50* (2006.01)

(52) U.S. Cl.
CPC ............ *G11B 15/32* (2013.01); *G11B 15/50* (2013.01)

(58) Field of Classification Search
None
See application file for complete search history.

(56) References Cited

U.S. PATENT DOCUMENTS

| | | | | |
|---|---|---|---|---|
| 3,819,124 A | * | 6/1974 | Marks et al. | G11B 23/037 242/610.4 |
| 4,609,164 A | * | 9/1986 | Komatsubara et al. | G11B 15/50 242/345 |
| 4,620,678 A | * | 11/1986 | Kumakura et al. | G11B 15/671 242/332.7 |
| 4,695,011 A | * | 9/1987 | Komatsubara et al. | G11B 15/50 242/597.6 |
| 5,301,073 A | * | 4/1994 | Katohno et al. | G11B 15/50 360/96.3 |
| 2002/0080530 A1 | | 6/2002 | Inoguchi et al. | |
| 2004/0069887 A1 | * | 4/2004 | Kim et al. | G11B 15/43 242/334 |
| 2005/0116078 A1 | * | 6/2005 | Seo et al. | G11B 15/50 242/356.5 |
| 2006/0093794 A1 | | 5/2006 | Yukawa et al. | |
| 2006/0151651 A1 | | 7/2006 | Stamm et al. | |
| 2008/0180831 A1 | | 7/2008 | Schartau | |
| 2011/0134562 A1 | | 6/2011 | Cherubini et al. | |
| 2015/0294683 A1 | * | 10/2015 | Harper et al. | G11B 15/18 360/75 |

FOREIGN PATENT DOCUMENTS

| | | |
|---|---|---|
| EP | 000107166 A1 | 5/1984 |
| EP | 000510867 A2 | 10/1992 |
| EP | 2711321 A1 | 3/2014 |
| JP | 62143245 A * | 6/1987 |
| JP | 01082355 A * | 3/1989 |

OTHER PUBLICATIONS

Panda et al., "Minimization of tape transient disturbances in track following tape drives with a disturbance observer," Microsystems Technologies 10, 2003, pp. 11-16.

* cited by examiner

*Primary Examiner* — Craig A. Renner
(74) *Attorney, Agent, or Firm* — Zilka-Kotab, P.C.

(57) ABSTRACT

An apparatus according to one embodiment includes a motor having a rotor, a take up reel coupled to the rotor, and a damping layer positioned between the rotor and the take up reel. The damping layer is constructed of a visco-elastic material. An apparatus according to another embodiment includes a motor having a rotor, a clutch coupled to the rotor, and a damping layer positioned between the rotor and the clutch. The damping layer is constructed of a visco-elastic material.

18 Claims, 14 Drawing Sheets

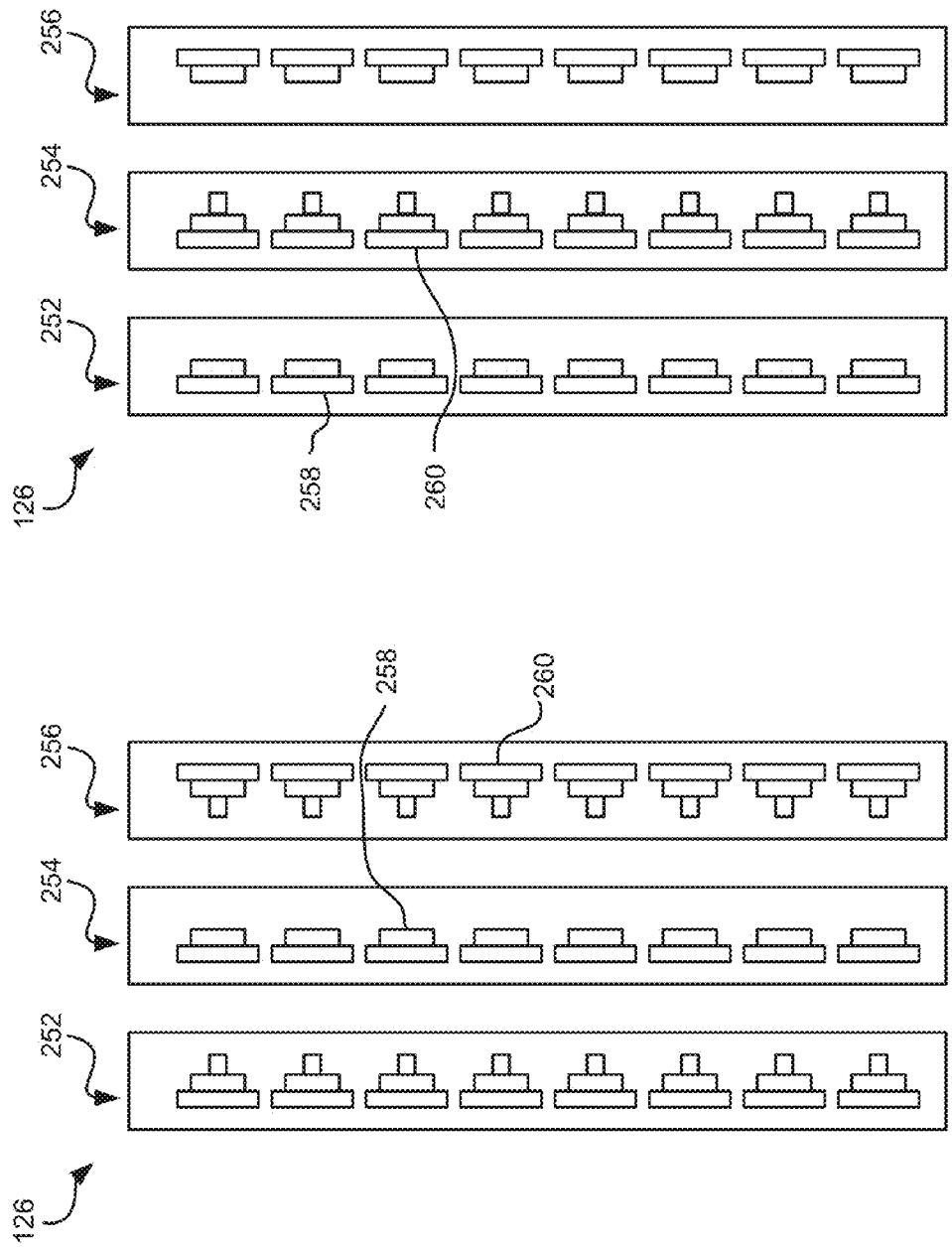

REDUCED REEL MOTOR DISTURBANCES IN A TAPE DRIVE SYSTEM

BACKGROUND

The present invention relates to data storage systems, and more particularly, this invention relates to tape drive motors having reduced runtime disturbances.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various problems in the design of a tape head assembly for use in such systems.

In a tape drive system, the drive moves the magnetic tape over the surface of the tape head at high speed. Usually the tape head is designed to minimize the spacing between the head and the tape. The spacing between the magnetic head and the magnetic tape is crucial and so a goal in these systems is to have the read elements in near contact with the tape to provide effective coupling of the magnetic field from the tape to the read elements.

BRIEF SUMMARY

An apparatus according to one embodiment includes a motor having a rotor, a take up reel coupled to the rotor, and a damping layer positioned between the rotor and the take up reel. The damping layer is constructed of a visco-elastic material.

An apparatus according to another embodiment includes a motor having a rotor, a clutch coupled to the rotor, and a damping layer positioned between the rotor and the clutch. The damping layer is constructed of a visco-elastic material.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

FIG. 6 is a partial tape bearing surface view of a magnetic head having a write-read-write configuration.

FIG. 7 is a partial tape bearing surface view of a magnetic head having a read-write-read configuration.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. Furthermore, it should be noted that, as used herein, the term "about" with reference to some stated value refers to the stated value+10% of said value.

The following description discloses several preferred embodiments of magnetic storage systems, as well as operation and/or component parts thereof. Various embodiments reduce the disturbances from tape drive reel motors by applying a constrained layer having a damping material between the motor magnet subassembly and the reel motor rotor flange supporting the magnet sub assembly.

In one general embodiment, an apparatus includes a motor having a rotor, a take up reel coupled to the rotor, and a damping layer positioned between the rotor and the take up reel. The damping layer is constructed of a visco-elastic material.

In another general embodiment, an apparatus includes a motor having a rotor, a clutch coupled to the rotor, and a damping layer positioned between the rotor and the clutch. The damping layer is constructed of a visco-elastic material.

Figure 1A:
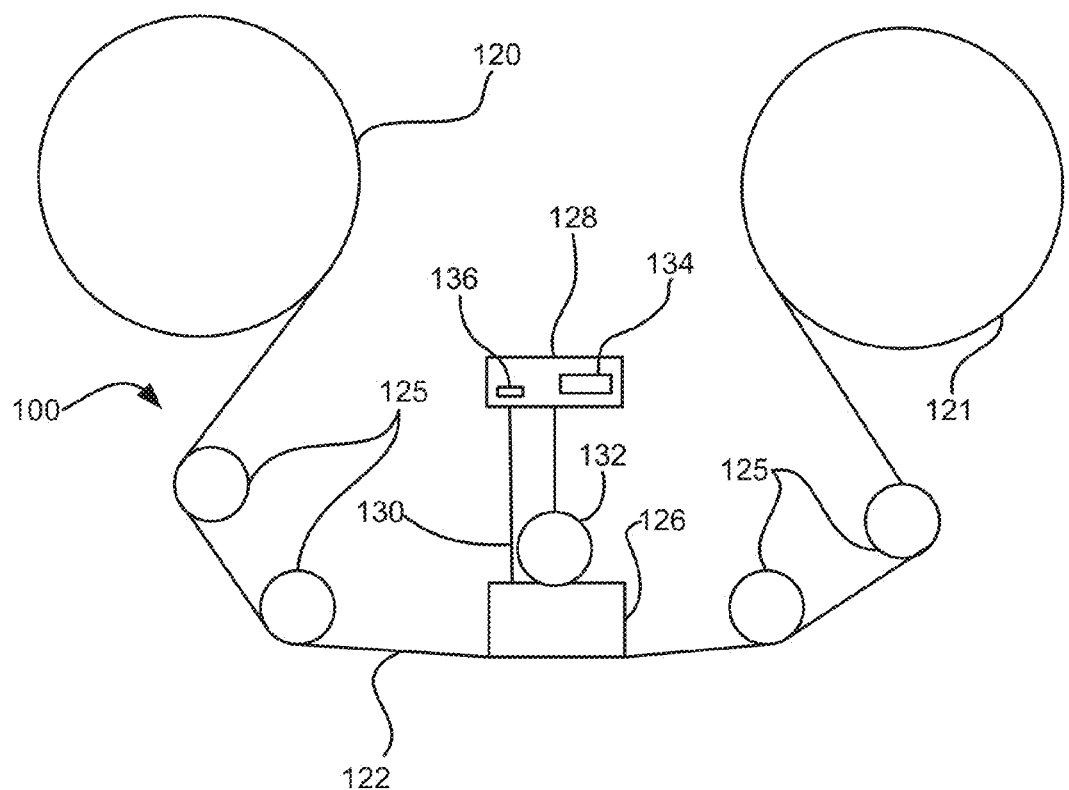
FIG. 1A is a schematic diagram of a simplified tape drive system according to one embodiment.

FIG. 1A illustrates a simplified tape drive 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the tape drive 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both.

According to various embodiments, the drive motor(s) may include any of the illustrative motor configurations described in detail below, e.g., see FIGS. 8-10. In preferred embodiments, "motors" as used herein refer to brushless motors, but are in no way limited thereto. Moreover, according to various embodiments, any of the motors described herein may include direct current (DC) or alternating current (AC) motors as will be appreciated by one skilled in the art upon reading the present description.

Referring still to FIG. 1A, guides 125 guide the tape 122 across the tape head 126. Such tape head 126 is in turn coupled to a controller 128 via a cable 130. The controller 128, may be or include a processor and/or any logic for controlling any subsystem of the tape drive 100. For example, the controller 128 typically controls head functions such as servo following, data writing, data reading, etc. The controller 128 may operate under logic known in the art, as well as any logic disclosed herein. The controller 128 may be coupled to a memory 136 of any known type, which may store instructions executable by the controller 128. Moreover, the controller 128 may be configured and/or programmable to perform or control some or all of the methodology presented herein. Thus, the controller may be considered configured to perform various operations by way of logic programmed into a chip; software, firmware, or other instructions being available to a processor; etc. and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (integral or external) to send and receive the data and for controlling the operation of the tape drive 100 and communicating the status of the tape drive 100 to the host, all as will be understood by those of skill in the art.

Figure 1B:
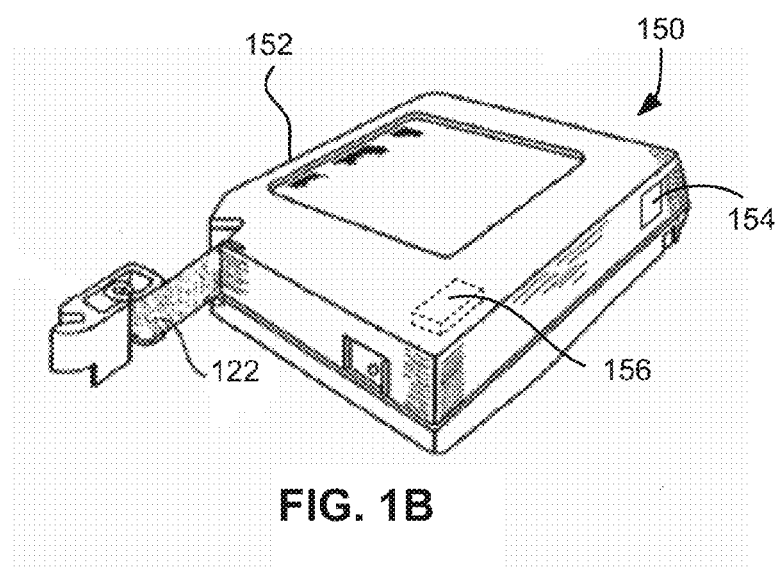
FIG. 1B is a schematic diagram of a tape cartridge according to one embodiment.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, ROM device, etc., embedded into or coupled to the inside or outside of the tape cartridge 150. The nonvolatile memory is accessible by the tape drive and the tape operating software (the driver software), and/or other device.

Figure 2:
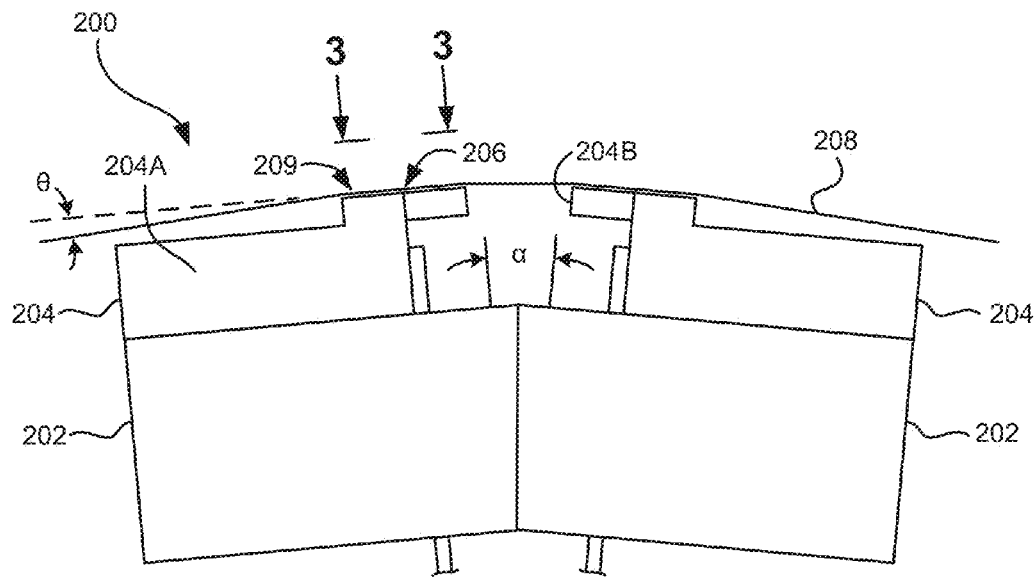
FIG. 2 illustrates a side view of a flat-lapped, bi-directional, two-module magnetic tape head according to one embodiment.

By way of example, FIG. 2 illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media bearing surfaces 209 are usually between about 0.1 degree and about 3 degrees.

The substrates 204A are typically constructed of a wear resistant material, such as a ceramic. The closures 204B made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 3:
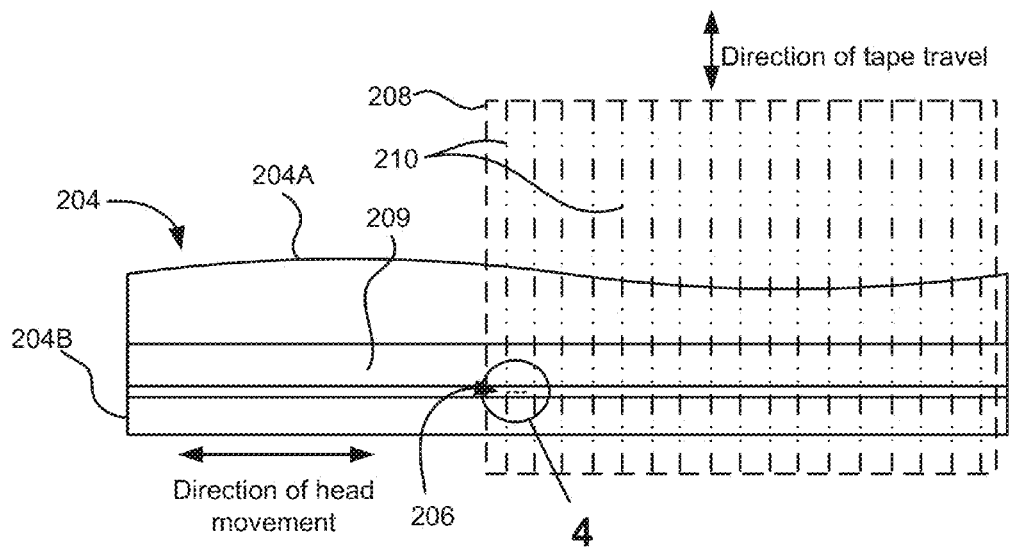
FIG. 3 is a tape bearing surface view taken from Line 3-3 of FIG. 2.

FIG. 3 illustrates the tape bearing surface 209 of one of the modules 204 taken from Line 3-3 of FIG. 2. A representative tape 208 is shown in dashed lines. The module 204 is preferably long enough to be able to support the tape as the head steps between data bands.

In this example, the tape 208 includes 4 to 22 data bands, e.g., with 16 data bands and 17 servo tracks 210, as shown in FIG. 3 on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 4:
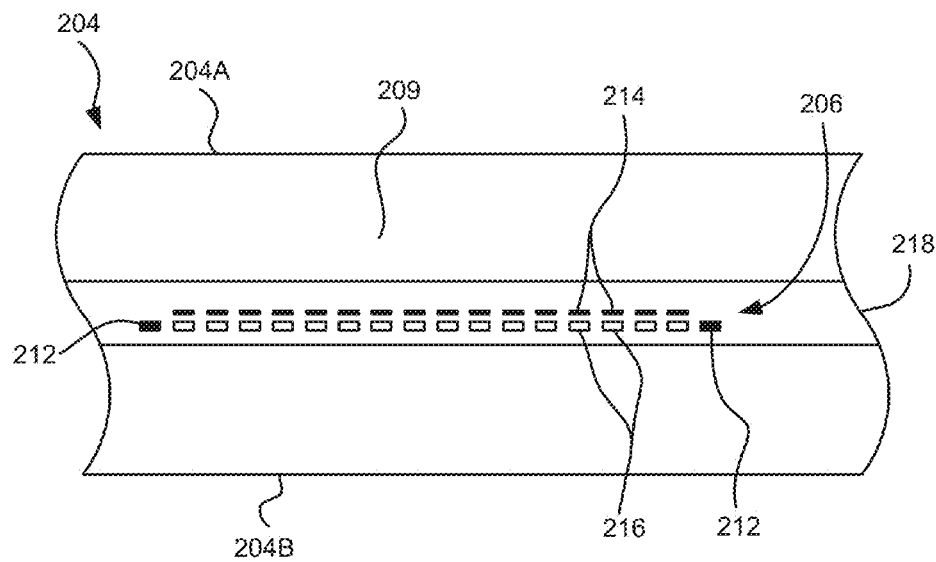
FIG. 4 is a detailed view taken from Circle 4 of FIG. 3.

FIG. 4 depicts a plurality of readers and/or writers 206 formed in a gap 218 on the module 204 in Circle 4 of FIG. 3. As shown, the array of readers and writers 206 includes, for example, 16 writers 214, 16 readers 216 and two servo readers 212, though the number of elements may vary. Illustrative embodiments include 8, 16, 32, 40, and 64 active readers and/or writers 206 per array, and alternatively interleaved designs having odd numbers of reader or writers such as 17, 25, 33, etc. An illustrative embodiment includes 32 readers per array and/or 32 writers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 4, the readers 216 and writers 214 may also be arranged in an interleaved configuration. Alternatively, each array of readers and/or writers 206 may be readers or writers only, and the arrays may contain one or more servo readers 212. As noted by considering FIGS. 2-4 together, each module 204 may include a complementary set of readers and/or writers 206 for such things as bi-directional reading and writing, read-while-write capability, backward compatibility, etc.

Figure 5:
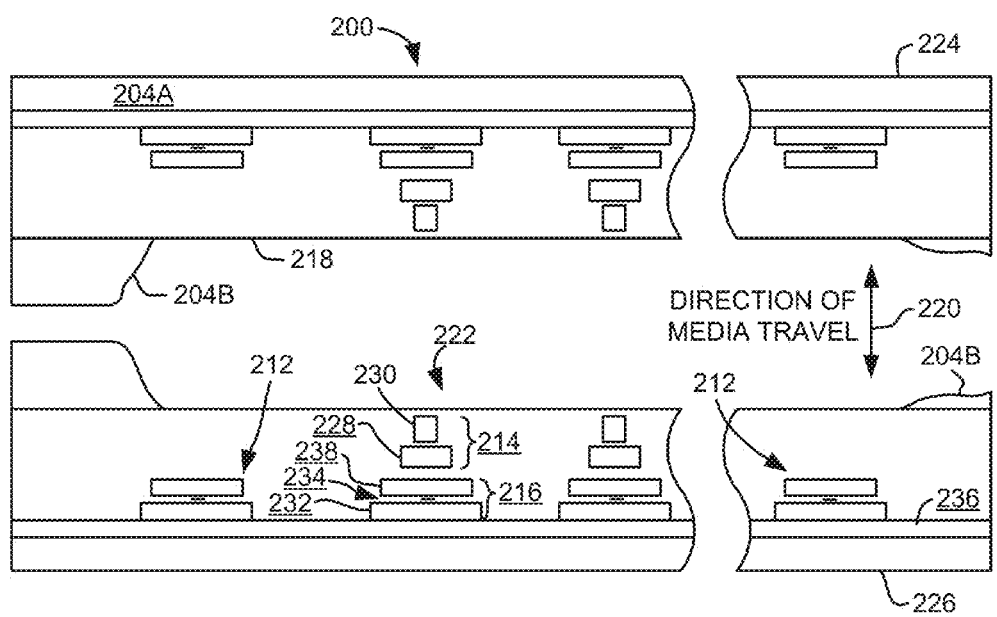
FIG. 5 is a detailed view of a partial tape bearing surface of a pair of modules.

FIG. 5 shows a partial tape bearing surface view of complimentary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write transducer 214 and the readers, exemplified by the read transducer 216, are aligned parallel to an intended direction of travel of a tape medium thereacross to form an R/W pair, exemplified by the R/W pair 222. Note that the intended direction of tape travel is sometimes referred to herein as the direction of tape travel, and such terms may be used interchangeable. Such direction of tape travel may be inferred from the design of the system, e.g., by examining the guides, observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked MR head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (—), CZT or Al—Fe—Si (Sendust), a sensor 234 for sensing a data track on a magnetic medium, a second shield 238 typically of a nickel-iron alloy (e.g., ~80/20 at % NiFe, also known as permalloy), first and second writer pole tips 228, 230, and a coil (not shown). The sensor may be of any known type, including those based on MR, GMR, AMR, tunneling magnetoresistance (TMR), etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of writers 260. The inner module 254 of FIG. 6 includes one or more arrays of readers 258 in a similar configuration. Variations of a multi-module head include a R-W-R head (FIG. 7), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Brushless motors for various tape drives are controlled by pulsing the input voltage. Coils are energized by the input voltage in pulsing configurations thereby creating magnetic fields which influence rotational motion of the motor. This provides the ability to control the rotational speed of the motor, but also has the side effect of inputting near square wave pulses into the motor. As a result, high frequency content, contained within the near square waveform, is injected into the hardware that make up the motor components. Moreover, it has been observed that when the pulse rate of the input voltage is at a particular frequency, the rotor of the motor can be driven to resonate at one of the mode shapes natural to the particular rotor. The result is that the head-to-tape interface is disturbed by one or more modes of the motor. Furthermore, as the motor resonates, increased PES is observed in the tape drive operation. Particularly, in a tape drive, resonance and/or oscillations along the rotational axis of the motor, perpendicular to the direction of tape travel, causes the reel carrying the tape to shift up and down, which in turn causes the tape to similarly shift as it passes over the head. Such shifting increases PES. Reshaping the pulsing input voltage to the motor is not a viable option.

In sharp contrast, various embodiments described herein desirably reduce or eliminates PES of tape drives by implementing a damping layer. The damping layer, which may preferably include visco-elastic materials, may form a bridge, e.g., bridge between components of the tape drive that are separated by a gap, to a relatively stiff component that rotates in unison to the reel rotor component. As a result, the embodiments described herein desirably achieve improved track following operations, as will be described in further detail below.

Figure 8A:
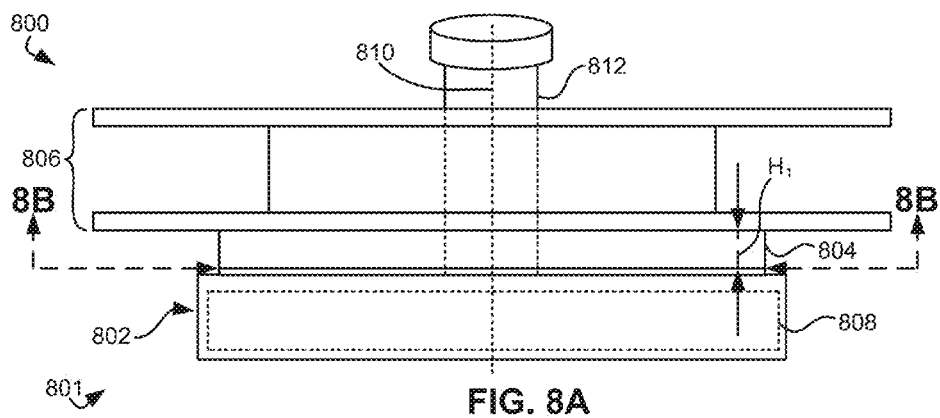
FIG. 8A is a partial side view of an apparatus according to one embodiment.

FIG. 8A depicts an apparatus 800, in accordance with one embodiment. As an option, the present apparatus 800 may be implemented in conjunction with features from any other embodiment listed herein, such as those described with reference to the other FIGS. Of course, however, such apparatus 800 and others presented herein may be used in various applications and/or in permutations which may or may not be specifically described in the illustrative embodiments listed herein.

Further, the apparatus 800 presented herein may be used in any desired environment. Thus FIG. 8A (and the other FIGS.) should be deemed to include any and all possible permutations. Note that additional components may be present in some embodiments. Moreover, unless otherwise specified, the various components of the apparatus 800 in this and other embodiments may be formed using conventional processes.

Referring now to FIG. 8A, the apparatus 800 includes a motor 801 having a rotor 802. According to various embodiments, the rotor 802 of apparatus 800 may have a flange configuration, e.g., a disk-like shape.

According to other embodiments, the rotor 802 may have a different shape and/or construction depending on the preferred embodiment. Alternate configurations are described in further detail below, e.g., see rotor 1710 of FIGS. 17A-18B.

The apparatus 800 of FIG. 8A further includes a take up reel 806 coupled to the rotor 802. The take up reel 806 may be coupled to the rotor 802 via an axle 812 of conventional construction. The axle 812 may also rotationally couple the rotor 802 to other components of the motor 801, which may also be conventional. The axle 812 may be coupled to a chuck (not shown) that drives a tape spool, for example. The axle 812 may also rotate about a rotational axis 810. The motor 801 may be a brushless-type motor, or any other type known in the art.

The apparatus 800 of FIG. 8A includes a damping layer 804 positioned between the rotor 802 and the take up reel 806.

The apparatus 800 may also include a magnet 808. The magnet 808 may be used to rotationally drive the axle 812.

A partial cross sectional view of the apparatus 800, taken along line 8B-8B, will now be momentarily referred to, e.g., to further illustrate configurations and views the damping layer 804.

Figure 8B:
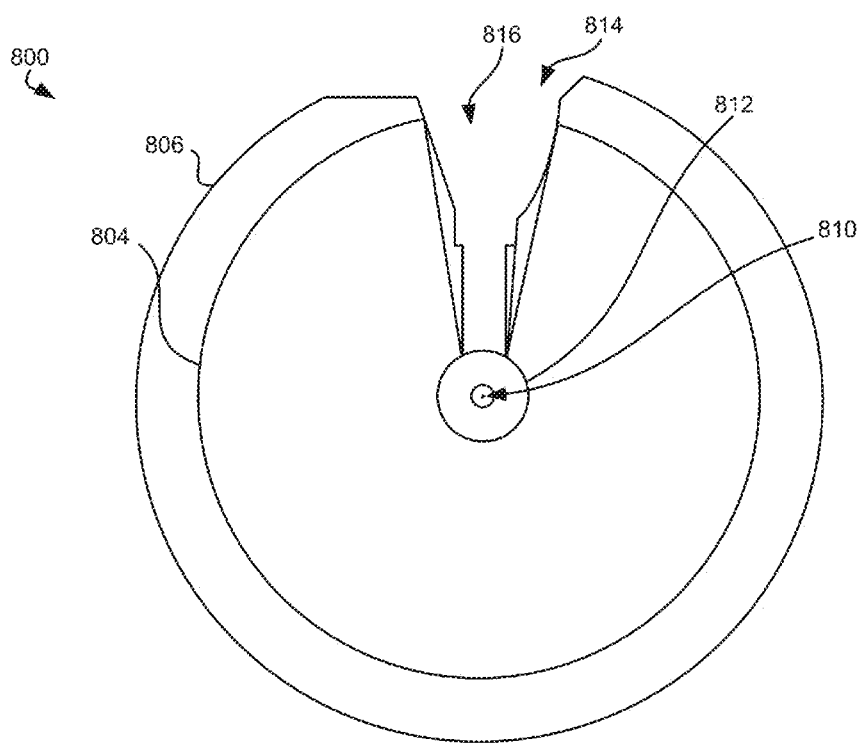
FIG. 8B is a cross-sectional view of the apparatus of FIG. 8A taken along line 8B according to one embodiment.

As illustrated in FIG. 8B, the damping layer 804 may have a C-shaped profile. The damping layer 804 may have a C-shaped profile, e.g., defined by a gap 816 in the damping layer 804, to match and/or closely conform to the profile of the take up reel 806 which may include a slot 814 for accepting a threader mechanism of the tape drive and/or a threading chuck of a tape (see, e.g., the leading portion of tape 122 in FIG. 1B).

The damping layer 804 matching and/or closely conforming to the profile of the take up reel 806 may prevent the damping layer 804 from crowding and/or interrupting the loading of the chuck of a tape into the take up reel slot 814.

It should be noted that the periphery of the damping layer 804 as shown in FIGS. 8A-8B is shown to not extend to the outer circumference of the take up reel 806, e.g., extending in a direction perpendicular to the rotational axis 810. Various embodiments may have a damping layer 804 circumference that is less than the circumference of the take up reel 806 and/or rotor 802. According to preferred embodiments, the circumference of the damping layer 804 may extend to or beyond the circumference of the take up reel 806, e.g., to maximize the damping of the resonating outer portions of the rotor 802.

Figure 9:
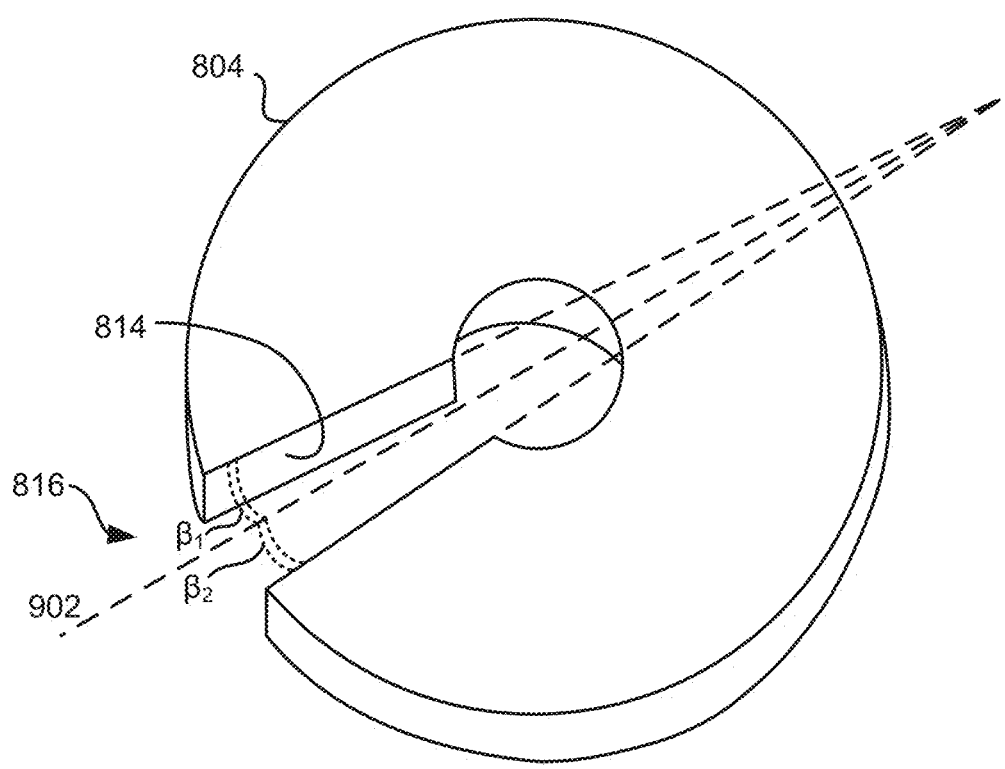
FIG. 9 is a perspective view of a damping layer according to one embodiment.

Referring now momentarily to FIG. 9, a perspective view of the C-shaped profile of the damping layer 804 of apparatus 800 is shown for further illustration and will now be described.

In some approaches, a normalized line 902, e.g., a line that runs through the middle of the gap 816 of the damping layer 804, may provide an angular measurement of the gap 816. The angular measurement of the gap 816 may be measured as the sum of a first angle $\beta_1$ and a second angle $\beta_2$ which are measured from the normalized line 902 to the closest portions of the damping layer 804.

According to one embodiment, the sum of the first angle $\beta_1$ and the second angle $\beta_2$ may be 23.2°, where the first angle $\beta_1$ and the second angle $\beta_2$ each equal 11.6°. The sum of the first angle $\beta_1$ and the second angle $\beta_2$ may be greater than or less than 23.2° according to further embodiments.

According to further embodiments, the damping layer 804 may have an O-shaped profile, where portions of the damping layer 804 adjacent to the slot 814 of the take up reel 806 are recessed, e.g., recessed to prevents impedance of the insertion and/or the removal of the chuck of the tape into the slot 814 of the take up reel 806. In such embodiments, the damping layer 804 may guide the chuck of the tape into the take up reel slot 814, e.g., as tape is initially wound onto the take up reel 806. Such a design may also be used in embodiments where the slot According to yet a further embodiment, the damping layer 804 may have an O-shaped profile when the take up reel does not include a slot 814.

The damping layer 804 may be constructed of a visco-elastic material. According to various embodiments, the damping layer 804 may include 3M-4991 VHB pressure-sensitive, closed-cell acrylic foam adhesive available from 3M having a sales address at 3M Center, St. Paul, Minn. 55144; 3M-4945 VHB pressure-sensitive, closed-cell acrylic foam adhesive available from 3M having the same sales address; Rogers Corporation PORON® foams available from Rogers Corporation having a sales address at Rm, 1101. Bldg. A. Oriental Media Center, NO 4. Guanghua Rd, Chaoyang District, Beijing 100026, China; etc.

According to further embodiments, the damping layer 804 may include EAR Specialty composites C1002 Isodamping thermoplastic materials available from EAR having a sales address at 7911 Zionsville Road Indianapolis, Ind. 46268; Roush RA205 damping foam available from Roush having a sales address at 12011 Market St., Livonia, Mich. 48150; any other visco-elastic material which would be apparent to one skilled in the art upon reading the present description; etc.

According to various embodiments, an adhesion layer (not shown) may be applied to the damping layer 804 and/or surfaces that the damping layer 804 contacts, e.g., the rotor 802, the take up reel 806, any other component of the apparatus, etc., for coupling purposes.

Referring again to FIG. 8A, according to various embodiments, the damping layer 804, by being constructed of a visco-elastic material, may serve as a compressed gap filler between the rotor 802 and the take up reel 806. For example, the damping layer 804 may be compressed, at least indirectly, e.g., due to an intervening layer, by the rotor 802 and take up reel 806 to a thickness $H_1$ that is about 90% or less than an uncompressed thickness of the damping layer 804. According to another example, the damping layer 804 may be compressed, at least indirectly by the rotor 802 and take up reel 806 to a thickness that is about 70° % or less than an uncompressed thickness of the damping layer 804.

The degree to which the damping layer 804 is compressed may vary, e.g., depending on the damping layer 804 material, depending on one or more design parameters of the apparatus 800, depending on a variable that would be appreciated by one skilled in the art upon reading the present disclosure, etc.

In testing, including the damping layer 804 between the rotor 802 and the take up reel 806 has been found to desirably maintain a proportionally low or non-existent amount of resonance along the rotational axis 810 of the apparatus 800.

Without wishing to be bound by any theory, it is believed that the damping layer 804 promotes the dissipation of energy, e.g., energy of resonance that would otherwise undesirably contribute to a higher PES during operation, such as by converting the kinetic energy to heat. The minimal resonance along the rotational axis 810 may result in part from the take up reel 806 being reinforced by the pressure that the compressed damping layer 804 applies to the take up reel 806.

The low and/or negligible remaining amount of resonance resulting after including the damping layer 804 in the apparatus 800 translates to a reduction in PES observed during tape drive operation.

Figure 12:
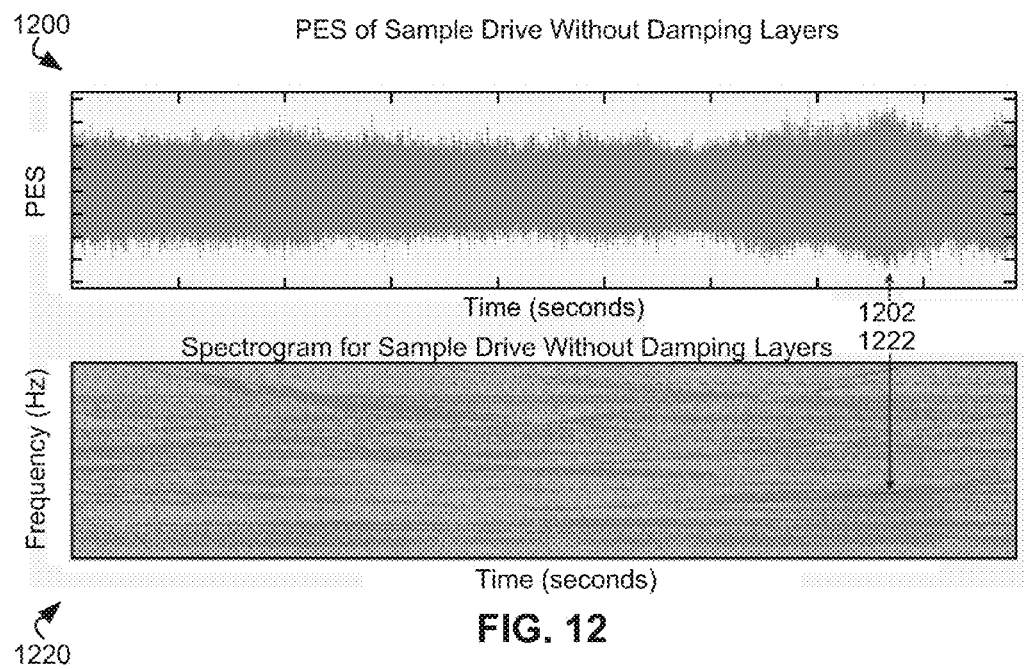
FIG. 12 is a plot of time versus frequency and time versus position error signal (PES) of an apparatus without a damping layer according to one embodiment.
Figure 13:
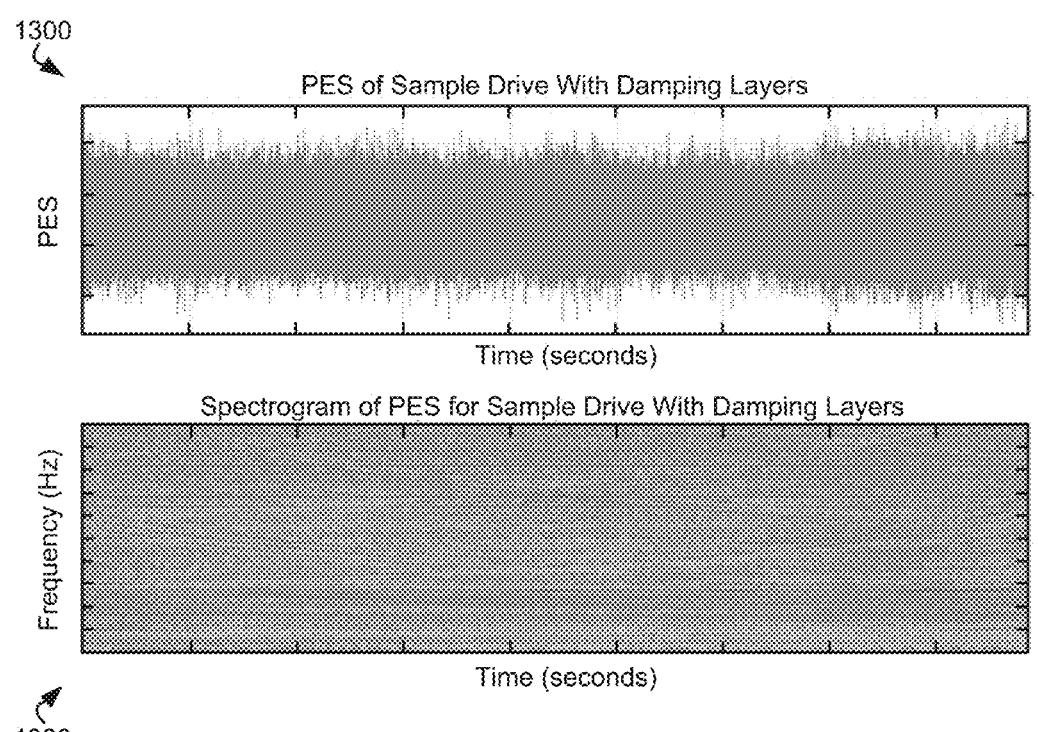
FIG. 13 is a plot of time versus frequency and time versus PES of an apparatus with one or more damping layer(s) according to one embodiment.
Figure 14:
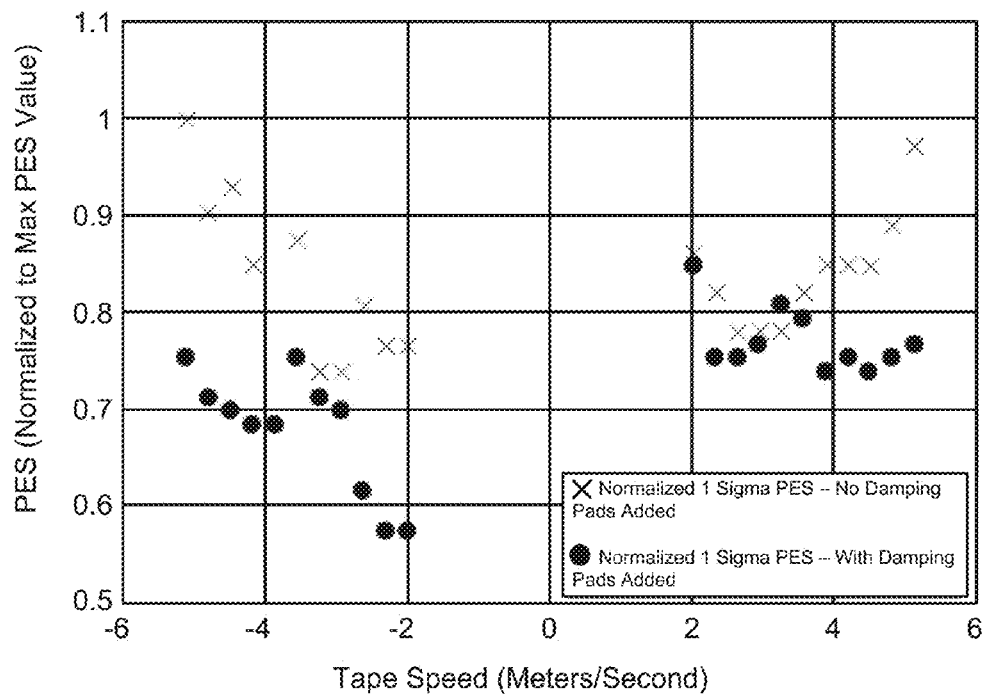
FIG. 14 is a plotting of tape speed versus normalized PES of an apparatus without a damping layer and an apparatus with one or more damping layer(s) according to one embodiment.

Exemplary reductions in the PES and/or resonance in the apparatus 800 will be illustrated in detail elsewhere herein, e.g., see FIGS. 12-14.

The damping layer may also be constructed of a material characterized by converting kinetic energy into heat (e.g., microscopic amounts of heat). According to various approaches, the damping layer 804 may include neoprene, foam, 3M High Performance acrylic pressure sensitive adhesive available from 3M having a sales address at 3M Center, St. Paul, Minn. 55144; 3M VHB closed cell acrylic pressure sensitive adhesive, 3M Vibration Damping Tapes 434, 435, 436, Roush damping foams available from Roush having a sales address at 12011 Market St., Livonia, Mich. 48150; energy dissipative rubber materials, damping adhesives, etc., or an energy dissipative material which would be apparent to one skilled in the art upon reading the present description.

The damping layer 804 may be a laminate of layers of visco-elastic material. The laminate of layers may be of the same type of visco-elastic material or may vary depending on the embodiment.

The damping layer 804, by having a material characterized by converting kinetic energy into heat, reduces the high frequency content resulting from the pulsing input voltage of the motor 801, thereby dissipating undesirable non-rotational movements of the magnet 808, e.g., primarily along a rotational axis 810 thereof. As previously mentioned, the damping layer 804 desirably reduces the disturbances caused by the pulsing input voltage. In preferred embodiments the damping layer 804 serves advantageously to dampen the pulsed forces transmitted to the magnet 808 in the axial direction, i.e., along rotational axis 810, and allow the low frequency content of the driving pulses to be transferred to the rotor 802. Thus the rotor 802 is allowed to rotate about an axis 810 as desired while reducing resonance which may cause high frequency content in the input pulse.

Figure 10:
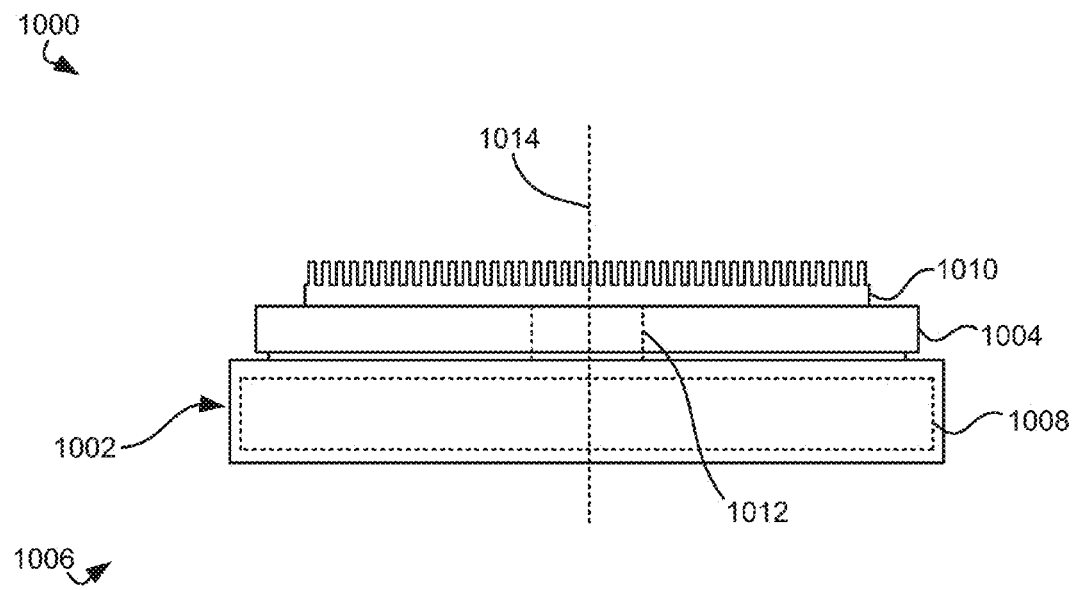
FIG. 10 is a partial side view of an apparatus according to one embodiment.

Referring now to FIG. 10, an apparatus 1000 according to another embodiment is shown.

FIG. 10 depicts the apparatus 1000, in accordance with one embodiment. As an option, the present apparatus 1000 may be implemented in conjunction with features from any other embodiment listed herein, such as those described with reference to the other FIGS. Of course, however, such apparatus 1000 and others presented herein may be used in various applications and/or in permutations which may or may not be specifically described in the illustrative embodiments listed herein.

Further, the apparatus 1000 presented herein may be used in any desired environment. Thus FIG. 10 (and the other FIGS.) should be deemed to include any and all possible permutations. Note that additional components may be present in some embodiments. Moreover, unless otherwise specified, the various components of the apparatus 1000 in this and other embodiments may be formed using conventional processes.

By way of example, apparatus 1000 may be used in the same system, e.g., tape drive, as apparatus 800. Apparatus 800 may be used in conjunction with a take up reel, while apparatus 1000 may be used to drive a reel in a tape cartridge, e.g., a tape cartridge as in FIG. 1B or any other type of tape cartridge. A further embodiment may have two apparatuses 1000, one for driving each of two spools in a dual spool cartridge.

The apparatus 1000 may include a motor 1006 having a rotor 1002. The motor 1006 may also include a magnet 1008. The motor 1006 and the first motor (see FIG. 8A) may be used as drive motors in a tape drive, e.g., tape drive 100 of FIG. 1A.

The apparatus 1000 may include a clutch 1010 coupled to the rotor 1002. The clutch 1010 may be configured to engage a reel, e.g., take up reel, cartridge spool, etc. to the motor 1006.

The apparatus 1000 includes a damping layer 1004 positioned between the rotor 1002 and the clutch 1010.

The apparatus 1000 may further include an axle 1012 of conventional construction, where the axle 1012 may rotationally couple the rotor 1002 to other components of the motor 1006. The axle 1012 may rotate about a rotational axis 1014.

The damping layer 1004 may be constructed of a visco-elastic material. In various embodiments, the damping layer 1004 may have a similar composition as the damping layer of FIG. 8A.

According to various embodiments having both the damping layer of FIG. 8A and the damping layer 1004, the damping layer of FIG. 8A and the damping layer 1004 may be different materials. According to a further embodiment, the damping layer of FIG. 8A and the damping layer 1004 may be the same materials.

Figure 19:
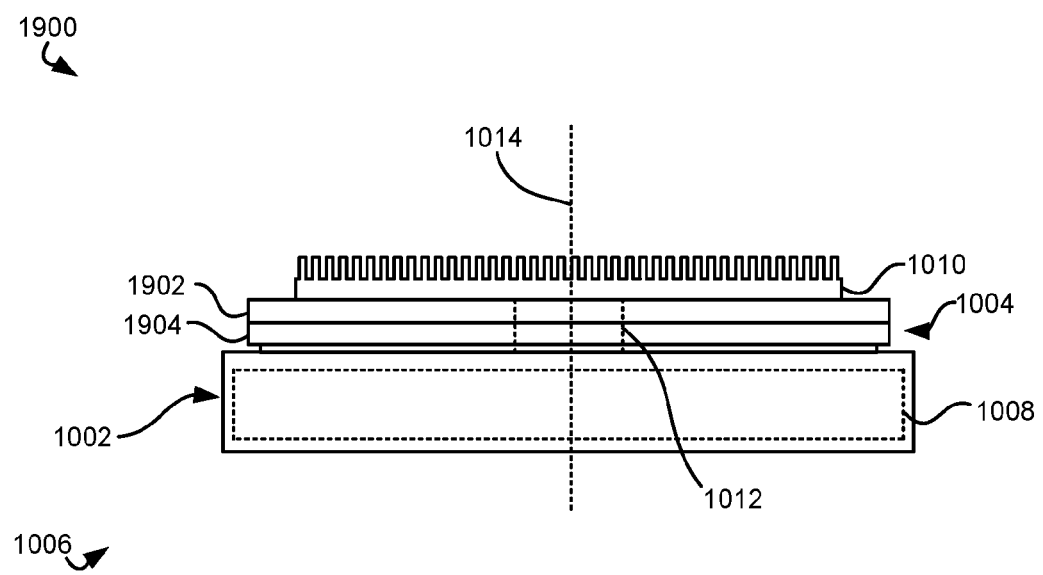
FIG. 19 is a partial side view of an apparatus according to one embodiment.

The damping layer 1004 may be a laminate of layers of visco-elastic material. For example, FIG. 19 illustrates an apparatus 1900 similar to that of FIG. 10, but having a damping layer 1004 that is a laminate of layers 1902, 1904 of visco-elastic material. According to one embodiment, each of the laminate of layers of visco-elastic material may be synchronously deposited, e.g., beginning with a first laminate layer of visco-elastic material deposited on the rotor 1002 or alternatively on the clutch 1010, and recessed to desired dimensions using a process that would be appreciated by one skilled in the art upon reading the present description.

Figure 11:
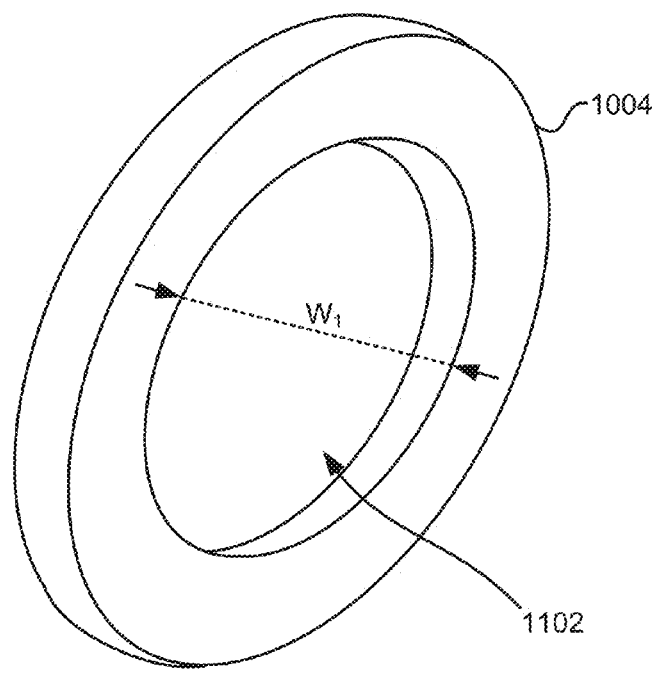
FIG. 11 is a perspective view of a damping layer according to one embodiment.

Referring now momentarily to FIG. 11, a perspective view of the damping layer 1004 is shown for further illustration and will now be described below.

The damping layer 1004 may have an annular shape, e.g., as depicted in FIG. 11. The damping layer 1004 may include a center hole 1102 with a width $W_1$.

It should be noted that the width $W_1$ and/or configuration of the center hole 1102 of the annular shaped damping layer 1004 may vary from the annular shape depicted in FIG. 11. For example, according to one embodiment, the width $W_1$ of the center hole 1102 of the damping layer 1004 may be just wide enough for the axle 1012 to pass therethrough. According to another embodiment, the width $W_1$ of the center hole 1102 of the damping layer 1004 may wider than the width of the axle 1012.

Referring again to FIG. 10, the damping layer 1004 may be compressed, at least indirectly, e.g., due to an intervening layer, by the rotor 1002 and clutch 1010 to a thickness that is about 90% or less than an uncompressed thickness of the damping layer 1004. According to a further embodiment, the damping layer 1004 may be compressed, at least indirectly, by the rotor 1002 and the clutch 1010 to a thickness that is about 70% or less than an uncompressed thickness of the damping layer 1004.

The damping layer 1004 may include concentric rings. Concentric rings may maximize the surface area, e.g., surface area of the rotors 1002 and/or surface area of the clutch 1010, that contacts, e.g., for purposes of maintaining a low PES in the apparatus 1000, the damping layer 1004.

It should be noted that when the damping layer 1004 includes more than one concentric ring, e.g., two concentric rings, three concentric rings, any number of concentric rings, etc., each of the more than one concentric rings may include the same and/or different material than other of the concentric rings. This may provide the ability to tune the performance characteristics of the damping layer 1004.

According to various embodiments, the clutch 1010 and a holder (not shown) for the magnet 1008 may be constructed as a single part, e.g., as a one-piece overmolded part. A metal magnet holder of such a component configuration may provide reinforcing stiffness to the clutch 1010, which may be any suitable material, such as plastic, metal, etc. In such embodiments, the combined clutch 1010 and the magnet 1008 may have a sufficient stiffness for the damping layer 1004 to efficiently maintain a relatively low and/or negligible PES, e.g., by limiting resonance, in the apparatus 1000.

According to another embodiment, the clutch 1010 and the magnet holder portion of the rotor 1002 may be two separate pieces. In such an embodiment, the clutch 1010 may not be stiffened by an integrated magnet holder and may not have sufficient rigidity for the damping layer 1004 to efficiently maintain a relatively low PES in the apparatus 1000. However, a third damping layer (not shown) may be positioned between the magnet holder and the clutch 1010, e.g., to provide such a rigidity and/or ensure a relatively low PES in the apparatus 1000. The third damping layer and/or the damping layer 1004 may act upon the magnet holder and may still be effective at damping the vibration of the motor 1006.

It should be noted that the third damping layer may be constructed of a visco-elastic material. Moreover, the third damping layer may have the same, similar, or a different composition than the damping layer 1004.

It should be noted that including damping layers in tape drives as described herein should not be interpreted to reduce undesirable PES levels and frequencies only at resonance events. Rather, the damping layers described herein may enable overall low operational PES levels and frequencies during acceleration of the tape reel, as well as during steady-velocity operation.

Referring now to FIG. 12, illustrative plots depicting relatively high levels of PES and motor resonance events occurring in a drive without damping layers will now be described below.

FIG. 12 depicts plots 1200, 1220, in accordance with a comparative embodiment. Plot 1200 of FIG. 12 includes a time vs PES plotting of readings from a sample drive that did not include damping layers. Plot 1200 includes a motor resonance event 1202. The motor resonance event 1202 was a higher than average PES event that occurred as a tape reel was accelerating, e.g., the motor 1006 and/or the motor 801 were rotating at a frequency that equates to the pulsing rate that causes the rotor 802 and/or the rotor 1002 to vibrate.

The motor resonance event 1202 may be characterized by a period of time in plot 1200 where the measured PES is relatively higher than the measured PES of one or more other periods of time in plot 1200.

Plot 1220 includes a time vs frequency spectrogram plotting, measured during operation of the sample drive, e.g., where the rotor of the tape drive is resonating at the measured frequencies. It should be noted that the time domains of the plots 1200, 1220 may be interpreted to be matched, i.e., each aligned in FIG. 12 with respect to one another so that the time domains of the plots 1200, 1220 are the same.

Plot 1220 includes a motor resonance event 1222, which corresponds in the time domain to the motor resonance event 1202 of plot 1200. In plot 1220, the motor resonance event 1222 is denoted by the darker cross hatch pointed to in the plot 1220.

The motor resonance event 1222 may have been a frequency and/or disturbance event that occurred as a tape reel was accelerating. The motor resonance event 1222 may be characterized by a period of time in plot 1220 where the measured frequency is relatively higher than the measured frequency of one or more other periods of time in plot 1220.

FIG. 13 depicts plots 1300, 1320 of the same sample drive as used to generate plots 1200, 1220, but with damping layers added to the motors.

A reduction in measured PES in response to including the damping layers was observed by comparing the measured PES during operation of the sample drive that included one or more damping layer(s), e.g. plot 1300, with the measured PES during operation of the sample drive without damping layers, e.g. plot 1200 in the current comparative example. Specifically, looking to the y-axis legends when comparing the plots 1200, 1300, the average amplitude of the PES measurements of plot 1200 is larger than the average amplitude of the PES measurements of plot 1300. Moreover, the motor resonance events 1202, 1222 of plots 1200, 1220 as the motor was accelerated to the frequencies of plot 1220 are not present in plots 1300, 1320.

Referring now to FIG. 14, the reduction in PES that resulted from including damping layer in a tape drive is illustrated by plot 1400. FIG. 14 depicts a plot 1400 of tape speed (meters/second) vs PES plotting, which contrasts the PES of the same tape drive during operation without damping layers (represented by the "X" symbols of plot 1400), with the PES of tape drives that include damping layers (represented by the black dots of plot 1400).

It should be noted that the values of plot 1400 have been measured and recorded from the actual testing events.

It should further be noted that the PES values of plot 1400 are normalized, e.g., normalized 1 sigma, against the largest values measured.

At each tape speed during testing, as recorded in plot 1400, the PES of the tape drive that had damping layers had less PES than the same tape drive without damping layers. This may illustrate an approximately 25% to 33% increase in the track following performance.

Concentric ring damping layers may also be used to limit PES in a tape drive, as will now be described below.

Figure 15:
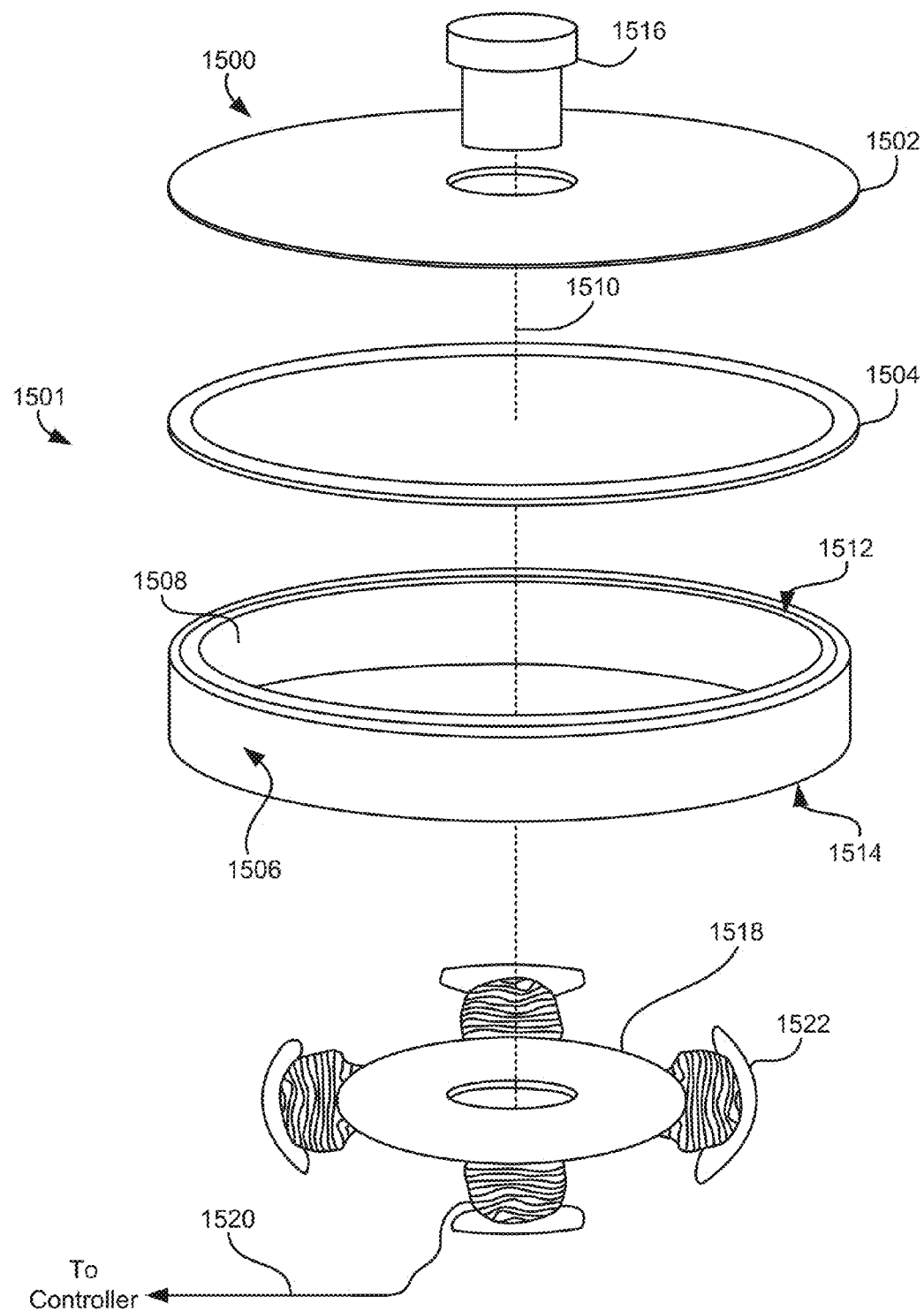
FIG. 15 is a partial exploded view of an apparatus according to one embodiment.

FIG. 15 depicts an apparatus 1500, in accordance with one embodiment. As an option, the present apparatus 1500 may be implemented in conjunction with features from any other embodiment listed herein, such as those described with reference to the other FIGS. Of course, however, such apparatus 1500 and others presented herein may be used in various applications and/or in permutations which may or may not be specifically described in the illustrative embodiments listed herein.

Further, the apparatus 1500 presented herein may be used in any desired environment. Thus FIG. 15 (and the other FIGS.) should be deemed to include any and all possible permutations. Note that additional components may be present in some embodiments. Moreover, unless otherwise specified, the various components of the apparatus 1500 in this and other embodiments may be formed using conventional processes.

Referring now to FIG. 15, the apparatus 1500 includes a motor 1501 having a rotor 1502. The rotor 1502 of apparatus 1500 is illustrated as having a flange configuration, e.g., a disk-like shape. However, according to other embodiments, the rotor 1502 may have a different shape and/or construction depending on the preferred embodiment, as will be described in further detail below, e.g., see rotor 1710 of FIGS. 17A-18B.

The apparatus 1500 of FIG. 15 further includes a magnet 1508, a damping layer 1504, and a pole piece 1506. The magnet 1508, damping layer 1504 and pole piece 1506 are preferably fixed relative to each other. In other words, the magnet 1508, damping layer 1504 and pole piece 1506 are coupled to each other such that they are not independently movable or rotatable. In some approaches, the magnet 1508, damping layer 1504 and/or pole piece 1506 may be coupled together using adhesives, e.g., double sided adhesives, heat triggered adhesives, pressure triggered adhesives, etc.; a pressure fit; thermal bond; etc.

Furthermore, according to the present embodiment, the magnet 1508, the pole piece 1506, and the damping layer 1504 are concentric rings. The magnet 1508 has an annular circumferential sidewall extending between first and second ends 1512, 1514 respectively. Moreover, the damping layer 1504 is positioned between the first end 1512 of the magnet 1508 and the rotor 1502. By positioning the damping layer 1504 between the rotor 1502 and the magnet 1508, the damping layer 1504 may desirably reduce PES experienced by the apparatus, as will soon become apparent.

Apparatus 1500 further includes an axle 1516 of known construction, which rotationally couples the rotor 1502 to the other components of the motor. The axle 1516 may be coupled to a chuck (not shown) that drives a tape spool, for example. Additionally, apparatus 1500 includes coiled poles 1522 of a stator 1518, of known construction. Lead line thread 1520 is coupled to a controller (not shown), in order to energize the coiled poles 1522.

As noted above, brushless motors typically exhibit torque pulsations along the rotational axis 1510. Torque pulsations in a tape drive lead to vertical shift of a tape reel, which in turn translates into a shift in tape position relative to the head, manifesting itself in increased PES.

In preferred embodiments, the damping layer 1504 includes a material characterized by converting kinetic energy into heat (e.g., microscopic amounts of heat). Thus according to various approaches, the damping layer 1504 may include neoprene, foam, 3M High Performance acrylic pressure sensitive adhesive available from 3M having a sales address at 3M Center, St. Paul, Minn. 55144; 3M VHB closed cell acrylic pressure sensitive adhesive, 3M Vibration Damping Tapes 434, 435, 436, Roush damping foams available from Roush having a sales address at 12011 Market St., Livonia, Mich. 48150; energy dissipative rubber materials, damping adhesives, etc., or any other energy dissipative material which would be apparent to one skilled in the art upon reading the present description.

The damping layer 1504, by having a material characterized by converting kinetic energy into heat, is able to reduce the high frequency content resulting from the pulsing input voltage of the motor 1501, thereby dissipating any undesirable non-rotational movements of the magnet 1508, e.g., primarily along a rotational axis 1510 thereof. As previously mentioned, the damping layer 1504 desirably reduces the disturbances caused by the pulsing input voltage. Specifically, in preferred embodiments the damping layer 1504 serves advantageously to dampen the pulsed forces transmitted to the magnet 1508 in the axial direction, i.e., along rotational axis 1510, and allow the low frequency content of the driving pulses to be transferred to the rotor 1502. Thus the rotor 1502 is allowed to rotate about an axis 1510 as desired while reducing the high frequency content in the input pulse, as is apparent in the modeling of FIG. 16.

Figure 16:
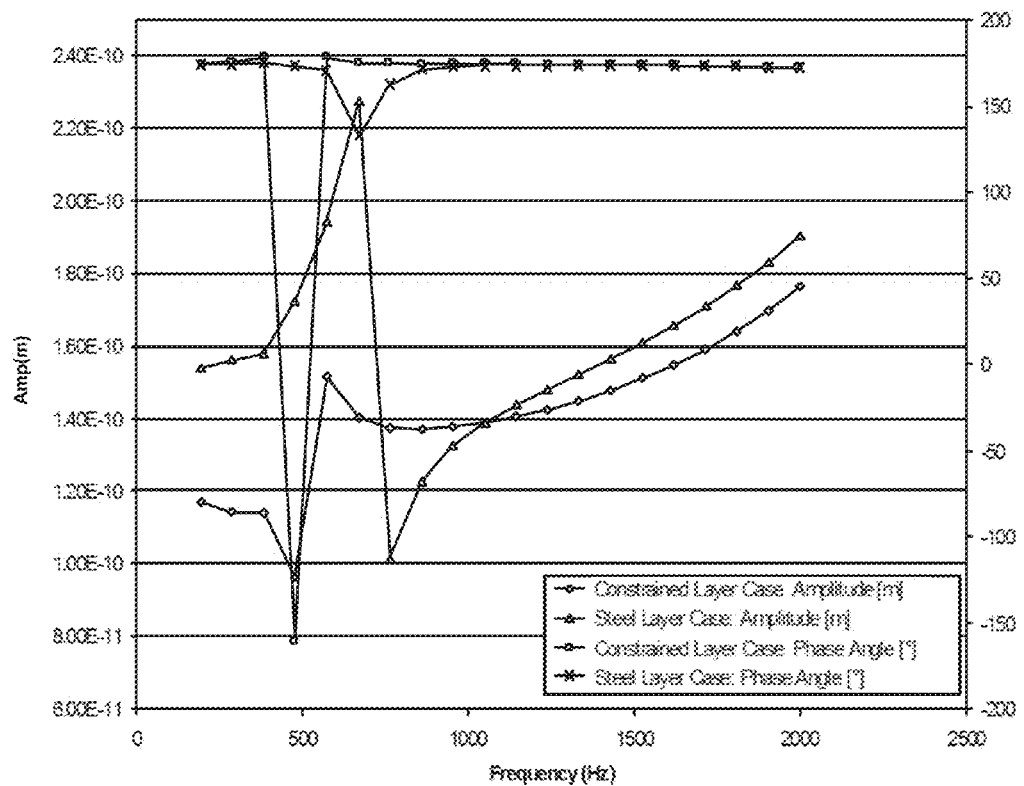
FIG. 16 is a modeled comparison of transfer functions for damping layers according to several embodiments.

FIG. 16 depicts a graphical comparison 1600 achieved using modeling for transfer functions according to different embodiments. Particularly, the graphical comparison 1600 illustrates data corresponding to the amplitude of resonances arising with damping layers constructed of two different materials. Modeling was conducted on an apparatus substantially similar to that of apparatus 1500 in FIG. 15. The plot labeled "Constrained Layer Case" represents data pertaining to an embodiment having a Neoprene rubber damping layer, while the plot labeled "Steel Layer Case" represents data pertaining to an embodiment having a steel damping layer. Furthermore, the modeling was limited to 2 kHz for the purpose of demonstrating the effect on a mode that has experimentally been observed to contribute to additional PES during the operation of an exemplary tape drive.

During modeling, simulated energy was input into the magnet, whereby the amplitude and phase angle of the motion that occurred during the resonance was plotted. Looking to FIG. 16, it can be seen that the Constrained Layer Case desirably has a resonance peak at about 500 Hz compared to the resonance peak at about 600 Hz for the Steel Layer Case. Moreover, the Constrained Layer Case resonance peak is lower in amplitude than that of the Steel Layer Case. It follows that, by implementing a damping layer having at least one of the materials described above (e.g., see description of 1504), the amplitude of the magnet's motion would be significantly reduced when transferred to the rotor of a motor. Therefore, PES of the apparatus is reduced and an improved track following operation is desirably achieved.

As described above, although the rotor 1502 of apparatus 1500 is illustrated as having a flange configuration, e.g., a disk-like shape, according to other embodiments, rotors described herein may have a different shape and/or construction depending on the preferred embodiment. Looking to FIGS. 17A-18B, apparatuses 1700, 1800 include rotors having a cup configuration, as will soon become apparent.

Figure 17A:
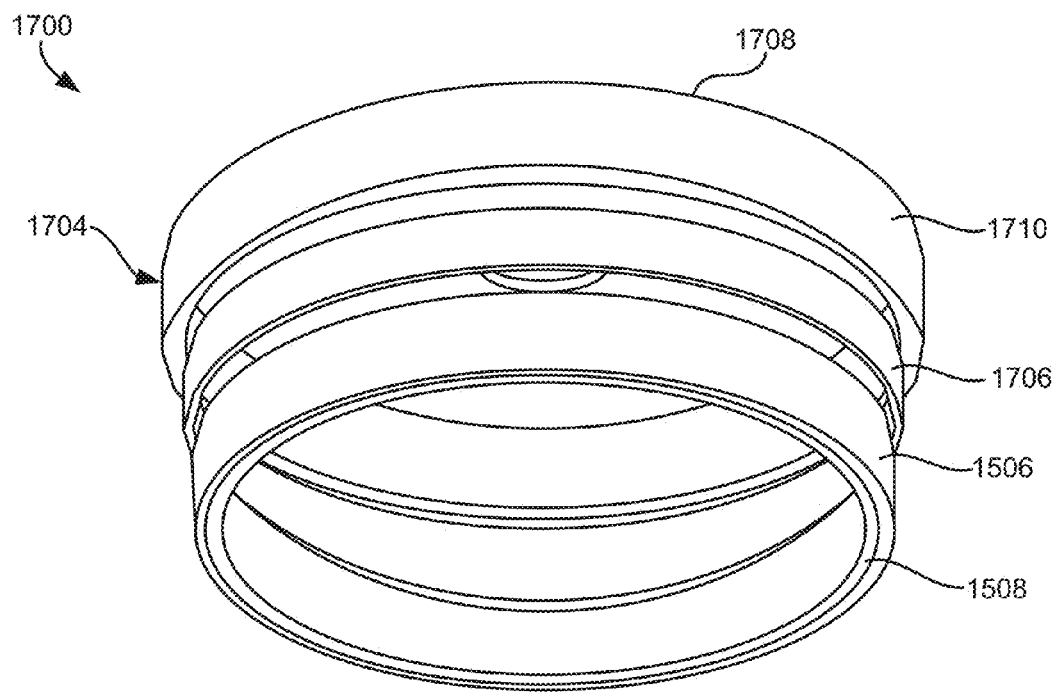
FIG. 17A is a partial exploded perspective view of an apparatus according to one embodiment.
Figure 17B:
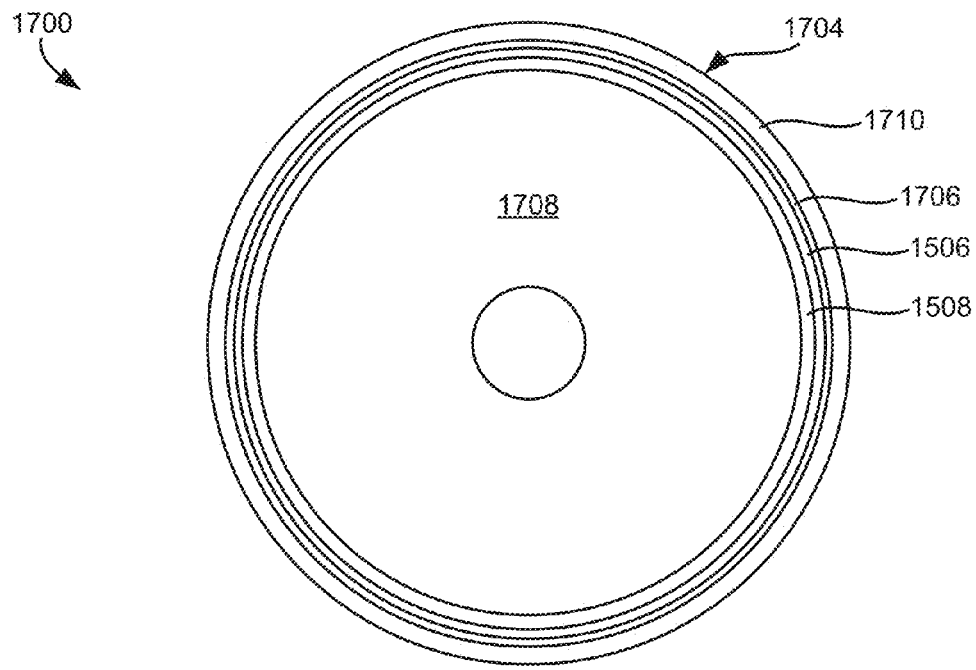
FIG. 17B is a partial bottom view of the motor in FIG. 17A.

FIGS. 17A-17B depict apparatus 1700, in accordance with one embodiment. As an option, the present apparatus 1700 may be implemented in conjunction with features from any other embodiment listed herein, such as those described with reference to the other FIGS., such as FIG. 15. Accordingly, various components of FIGS. 17A-17B have common numbering with those of FIG. 15.

Of course, however, such apparatus 1700 and others presented herein may be used in various applications and/or in permutations which may or may not be specifically described in the illustrative embodiments listed herein. Further, the apparatus 1700 presented herein may be used in any desired environment. Thus FIGS. 17A-17B (and the other FIGS.) should be deemed to include any and all possible permutations.

Referring now to FIGS. 17A-17B, rotor 1710 has a cup configuration as opposed to the flange configuration of the rotor 1502 in FIG. 15. Thus, the rotor 1710 of apparatus 1700 is cup shaped, having a sidewall 1704 extending away from a flange 1708 of the rotor 1710, and along an outer circumference of the magnet 1508.

With continued reference to FIGS. 17A-17B, the damping layer 1706 is illustrated as being positioned between the pole piece 1506 and the sidewall 1704 of the rotor 1710. The pole piece 1506 is oriented between the magnet 1508 and the sidewall 1704 of the rotor 1710. Furthermore, the pole piece 1506 is positioned between the magnet 1508 and the damping layer 1706.

Figure 18A:
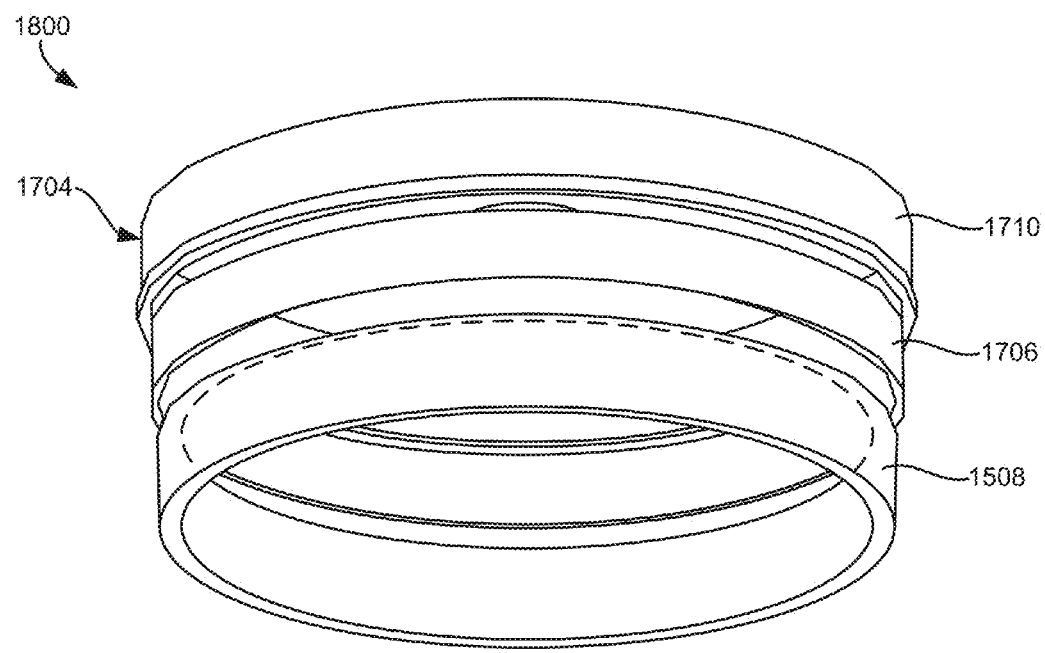
FIG. 18A is a partial exploded perspective view of an apparatus according to one embodiment.
Figure 18B:
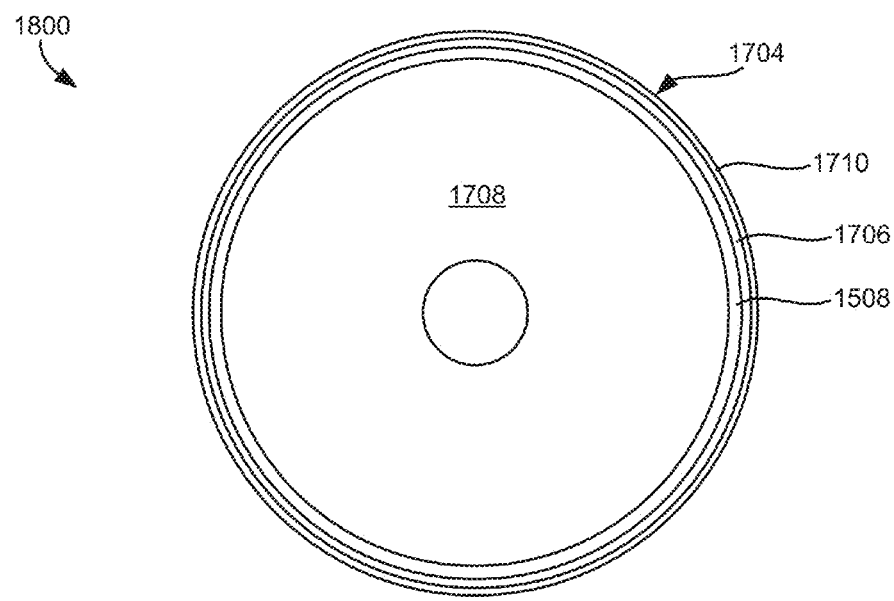
FIG. 18B is a partial bottom view of the motor in FIG. 18A.

FIGS. 18A-18B depict an apparatus 1800 according to one embodiment that is a variant of the apparatus 1700 shown in FIGS. 17-17B, and thus has common numbering therewith for similar components. As an option, the present apparatus 1800 may be implemented in conjunction with features from any other embodiment listed herein, such as those described with reference to the other FIGS., such as FIG. 15. Accordingly, various components of FIGS. 18A-18B have common numbering with those of FIG. 15.

Of course, however, such apparatus 1800 and others presented herein may be used in various applications and/or in permutations which may or may not be specifically described in the illustrative embodiments listed herein. Further, the apparatus 1800 presented herein may be used in any desired environment. Thus FIGS. 18A-18B (and the other FIGS.) should be deemed to include any and all possible permutations.

It will be clear that the various features of the foregoing systems and/or methodologies may be combined in any way, creating a plurality of combinations from the descriptions presented above. Furthermore, it should be noted that any of the "motors" described herein are not limited to being tape drive motors. Rather, any of the embodiments described above may be implemented in DC brushless motors, AC brushless motors, etc., and/or any other type of motor which would be apparent to one skilled in the art upon reading the present description.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. An apparatus, comprising:
a motor having a rotor;
a take up reel coupled to the rotor; and
a damping layer positioned between the rotor and the take up reel,
wherein the damping layer is constructed of a visco-elastic material,
wherein the damping layer is compressed, by the rotor and take up reel, to a thickness that is about 90% or less than an uncompressed thickness of the damping layer.

2. The apparatus of claim 1, wherein the damping layer is constructed of a material characterized by converting kinetic energy into heat.

3. The apparatus of claim 1, wherein the damping layer has an annular profile.

4. The apparatus of claim 1, wherein the damping layer includes a laminate of layers of visco-elastic material.

5. The apparatus of claim 1, wherein the damping layer is compressed, by the rotor and take up reel, to a thickness that is about 70% or less than an uncompressed thickness of the damping layer.

6. The apparatus of claim 1, comprising:
a magnetic head;
a guide for guiding a magnetic medium onto the take up reel; and
a controller electrically coupled to the motor.

7. An apparatus, comprising:
a motor having a rotor;
a take up reel coupled to the rotor; and
a damping layer positioned between the rotor and the take up reel,
wherein the damping layer is constructed of a visco-elastic material,
wherein the damping layer has a C-shaped profile.

8. The apparatus of claim 7, wherein the damping layer is constructed of a material characterized by converting kinetic energy into heat.

9. The apparatus of claim 7, wherein the damping layer includes a laminate of layers of visco-elastic material.

10. The apparatus of claim 7, comprising:
a magnetic head;
a guide for guiding a magnetic medium onto the take up reel; and
a controller electrically coupled to the motor.

11. The apparatus of claim 7, wherein the damping layer is compressed, by the rotor and take up reel, to a thickness that is about 90% or less than an uncompressed thickness of the damping layer.

12. An apparatus, comprising:
a motor having a rotor;
a take up reel coupled to the rotor;
a damping layer positioned between the rotor and the take up reel,
wherein the damping layer is constructed of a visco-elastic material;
a second motor having a second rotor;

a clutch coupled to the rotor; and a second damping layer positioned between the rotor and the clutch, wherein the second damping layer is constructed of a visco-elastic material.

13. The apparatus of claim 12, comprising a third damping layer positioned between a magnet holder of the rotor and the clutch, wherein the clutch and magnet holder are separate parts.

14. The apparatus of claim 12, wherein the damping layer and the second damping layer are of different materials.

15. The apparatus of claim 12, wherein the second damping layer has an annular profile.

16. The apparatus of claim 12, wherein the second damping layer is a laminate of layers of visco-elastic material.

17. The apparatus of claim 12, wherein the second damping layer is compressed, by the rotor and clutch to a thickness that is about 90% or less than an uncompressed thickness of the damping layer.

18. The apparatus of claim 12, comprising:

a magnetic head;

a guide for guiding a magnetic medium onto the take up reel; and a controller electrically coupled to the motor and the second motor.

* * * * *